Oct. 20, 1925.  
C. F. WOLF  
RIM FOR VEHICLE TIRES  
Filed Nov. 27, 1922  
1,558,212  
2 Sheets-Sheet 1
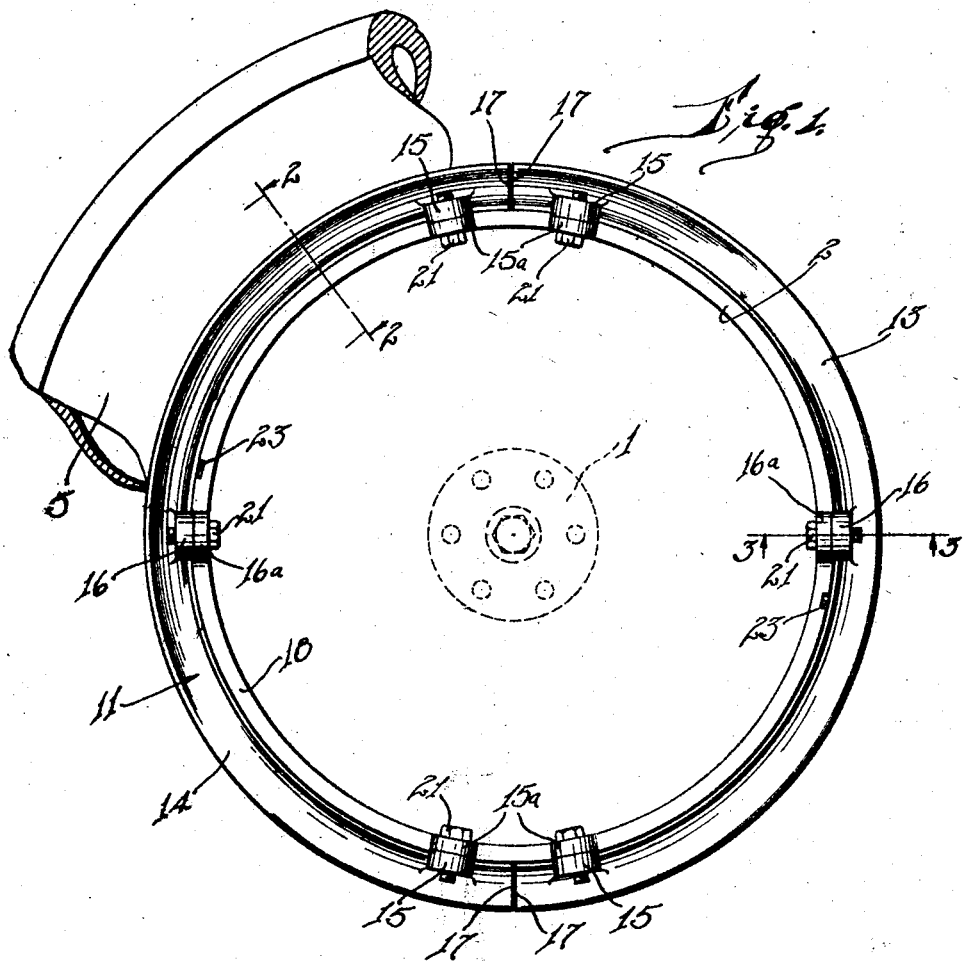
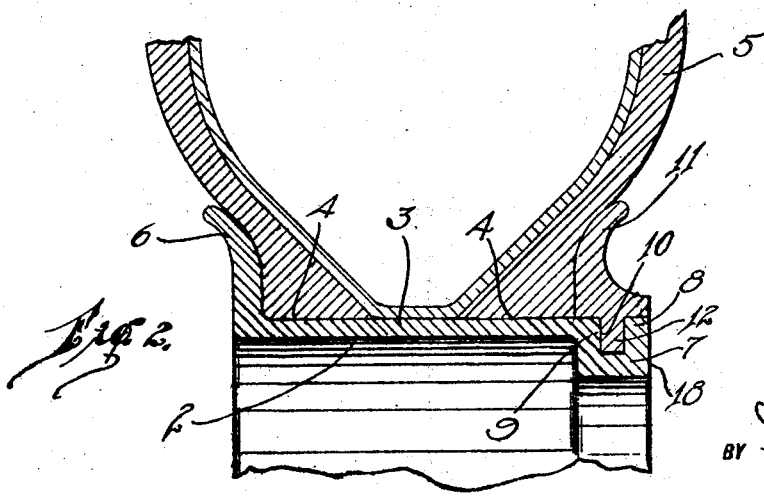
INVENTOR  
C.F. Wolf  
BY  
ATTORNEYS

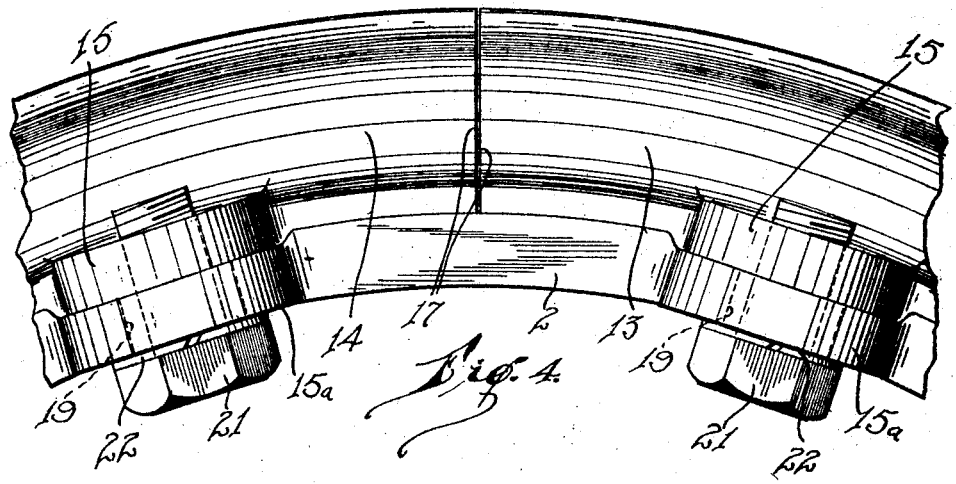
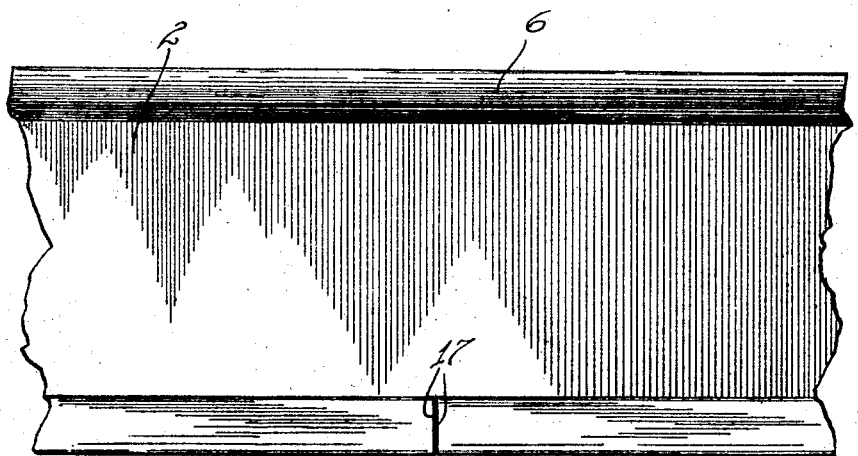
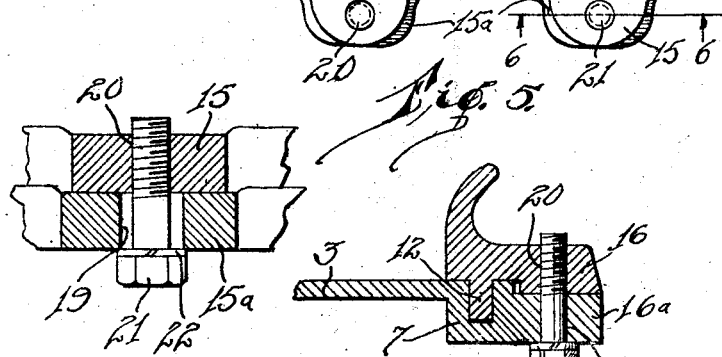

Patented Oct. 20, 1925.

1,558,212

UNITED STATES PATENT OFFICE.

CARL FRED WOLF, OF CHICAGO, ILLINOIS.

RIM FOR VEHICLE TIRES.

Application filed November 27, 1922. Serial No. 603,664.

*To all whom it may concern:*

Be it known that I, CARL FRED WOLF, a citizen of the United States, and a resident of Chicago, in the county of Cook and State of Illinois, have invented a new and useful Improvement in Rims for Vehicle Tires, of which the following is a full, clear, and exact description.

My invention relates to improvements in rims for vehicle tires, and it consists in the combinations, constructions, and arrangements herein described and claimed.

An object of my invention is to provide a rim of the character described from which the vehicle tire may be quickly and easily removed without the use of special tools or rim tools.

A further object of my invention is to provide a device of the character described in which the retaining ring is constructed of two parts which are arranged to be drawn toward the center of the vehicle wheel by means of bolts and not sprung over the vehicle rim as in the ordinary type of retaining rings in present use.

A further object of my invention is to provide a device of the character described which precludes entirely the necessity of hammering the retaining ring to either set it in place upon the rim or to remove it from the rim. In the ordinary type of retaining ring, the ring is frequently battered by the necessary use of a mallet or the like to free the ring from its close engagement with the wheel rim. It is apparent that such mutilation of the ring occasions a great deal of difficulty in the subsequent application of the ring to the rim.

A further object of my invention is to provide a device of the character described that is extremely simple in construction, that is durable, and thoroughly practical for the purpose intended.

Other objects and advantages will appear in the following specification, and the novel features of the invention will be particularly pointed out in the appended claim.

My invention is illustrated in the accompanying drawings, forming part of this application, in which Figure 1 is a front elevation of an embodiment of my invention with a portion of the vehicle tire shown upon the rim, Figure 2 is an enlarged sectional view along the line 2—2 of Figure 1, Figure 3 is an enlarged sectional view along the line 3—3 of Figure 1, Figure 4 is an enlarged fragmentary elevation of the mechanism illustrated in Figure 1, Figure 5 is a top plan view of the mechanism illustrated in Figure 3, and Figure 6 is a sectional view along the line 6—6 of Figure 5.

In carrying out my invention, I make use of a vehicle wheel, such as the ordinary type now in use. In Figure 1 I have indicated in dotted lines the ordinary type of steel wheel 1. A tire holding rim is composed of a rim section 2 and a tire retaining ring 11 which are mounted upon the wheel 1. This tire rim section 2 may of course be a demountable rim, such as is common in the art, or merely the rim fixed upon the wheel 1. It is immaterial in so far as my present invention is concerned whether the rim section 2 is demountable or not. The major portion of the rim section 2 has a sectional contour resembling that shown in the section Figure 2, and is much the same as the ordinary type of vehicle tire rim. The rim section 2 is provided with a substantially horizontal portion 3, upon the outer peripheral wall 4 of which a vehicle tire casing 5 is mounted. The rim section 2 is provided with an integral side wall 6 at the peripheral edge thereof, and an inwardly extending flange 7 disposed adjacent to the other peripheral edge. This flange 7 is angular in form and provides intermediate the adjacent wall portions 8 and 9 thereof, a groove 10. The removable retaining ring 11 is provided with an inward radially extending flange 12 and is arranged to be received with the flange 12 in the groove 10, thereby preventing lateral movement of the ring 11.

The retaining ring 11, as may be seen in Figure 1, is constructed of two identical parts 13 and 14, which when placed with their ends abutting, form a perfect annulus. So far the construction is identical with the ordinary type of tire retaining construction with the exception that the retaining ring 11 is composed of two parts whereas the ordinary retaining ring is merely a split ring which must be actually sprung to occasion its lodgement in the groove 10.

The retaining ring in my present invention differs further from the ordinary type of retaining ring in that the parts 13 and 14 of the ring 11 are provided with three outwardly extending lugs 15 and 16. The lugs 15 are disposed adjacent the ends 17 of the parts 13 and 14 and the lug 16 is disposed intermediate the length of each part substantially at the mid point thereof. This construction may be more fully understood by an inspection of Figure 3 in which the lug 16 is shown in section.

The outer side wall 18 of the flange 7 of the rim 2 is provided with six outwardly extending lugs 15ᵃ and 16ᵃ, the lugs 15ᵃ being in registration with the lugs 15 on the ring 11, and the lugs 16ᵃ in registration with the lugs 16 of the ring 11.

A further inspection of Figure 3 will reveal that the lugs 16ᵃ are less in thickness than the depth of the side wall 18 of the flange 7. This construction is also found in the case of the lugs 15ᵃ and is for the purpose of readily permitting the removal of the pieces 13 and 14 of the ring 11, and also for ease in the removal of the vehicle tire casing 5 which might engage with the lug portions and occasion damage to the casing or the delicate tube contained within the casing as the casing is removed or placed upon the rim section 2.

Each of the lugs 15ᵃ and 16ᵃ is provided with an elongated opening 19 extending transversely therethrough as indicated in Figure 6, while each of the lugs 15 and 16 is provided with a threaded opening 20 transversely therethrough. Bolts 21 are disposed one for engagement with each of the threaded opening 20 and by means of which the lugs 15 and 16 may be drawn toward the lugs 15ᵃ and 16ᵃ, respectively, to occasion the movement of the pieces 13 and 14 toward the rim section 2. I prefer to use lock washers 22 in conjunction with the bolts 21 to obviate the possibility of the bolts becoming unfastened from road vibration.

Means for facilitating the removal of the pieces 13 and 14 from engagement with the groove 10 of the rim section 2 is provided in transverse grooves 23 in the upper edge of the side wall 18 of the flange immediately adjacent the lugs 16ᵃ. This groove permits the entrance of a screw driver or the like by means of which the pieces 13 and 14 may be moved away from the rim section which might be somewhat difficult if the pieces had become rusted to a degree as in the case of prolonged application without removal. After the pieces 13 and 14 have once become free from engagement with the trough 10, it is of course an easy matter to manually remove them entirely from engagement with the rim section.

From the foregoing description of the various parts of the device, the operation thereof may be readily understood. In applying the vehicle tire to my improved rim construction, I first remove the bolts 21 and insert a screw driver or the like in the groove 23 by means of which I pry the pieces 13 and 14 one at a time loose from engagement with the rim section 2, and once having overcome the slight adhesive condition which might be occasioned by rust or the like, the pieces 13 and 14 are manually removed. The movement is away from the wheel and in a radial direction, and not laterally with the wheel as in the case of the ordinary type of split ring which is first removed from the groove and then drawn laterally from the wheel.

The next movement of course is the placing of the vehicle tire casing 5 upon the rim section 2 which is comparatively easy and is done in a manner well known in the art. The lugs 15ᵃ and 16ᵃ will not interfere with the application of the casing, since they are spaced inwardly from the outer peripheral surface of the flange 7 as is clearly shown in Figures 3 and 4.

The casing 5 is locked upon the rim section 2 by placing the pieces 13 and 14 with their flange portions 12 in the groove 10 and their ends 17 adjacent one another. The bolts 21 are then projected through the elongated openings 19 of the lugs 15ᵃ and 16ᵃ, respectively, and then moved into engagement with the threaded openings 20 of the lugs 15 and 16, respectively. The bolts 21 are then tightened with the ordinary wrench and the tightening of the bolts causes the pieces 13 and 14 to move toward the center of the wheel until the ends 17 abut one another, although this is not necessary, since the pieces would work equally as well if the ends 17 did not abut. The vehicle wheel is now ready for use.

I claim:

A device of the type described comprising a rim section having an integral tire retaining flange on one side and an annular groove disposed adjacent to the other side, a tire retaining ring consisting of two semi-circular pieces having flanges adapted to enter said groove, lugs having threaded bores and being carried by said pieces, each of said pieces having one of the lugs disposed adjacent to each end thereof, and having one lug disposed intermediate the ends, said lugs projecting laterally from said pieces and having their inner surfaces disposed nearer the radial center of the pieces than the inner surfaces of said pieces, lugs carried by said rim section and being positioned on said rim section so as to be aligned with said first named lugs when said pieces are disposed on the rim section, the lugs on said rim section that align with the lugs disposed adjacent to the ends of said pieces having slots therein, and bolts securing adjacent lugs together.

CARL FRED WOLF.